(12) United States Patent
Koyama et al.

(10) Patent No.: US 8,005,300 B2
(45) Date of Patent: Aug. 23, 2011

(54) IMAGE SEARCH SYSTEM, IMAGE SEARCH METHOD, AND STORAGE MEDIUM

(75) Inventors: Takahiro Koyama, Kanagawa (JP); Shigehisa Kawabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/715,773

(22) Filed: Mar. 2, 2010

(65) Prior Publication Data

US 2010/0191769 A1 Jul. 29, 2010

Related U.S. Application Data

(62) Division of application No. 11/441,362, filed on May 25, 2006, now Pat. No. 7,801,392.

(30) Foreign Application Priority Data

Jul. 21, 2005 (JP) ................................. 2005-211775
Dec. 19, 2005 (JP) ................................. 2005-365409

(51) Int. Cl.
*G06K 9/00* (2006.01)
(52) U.S. Cl. ......... 382/182; 382/229; 382/305; 715/209
(58) Field of Classification Search .................. 382/305, 382/173, 182; 715/209
See application file for complete search history.

(56) References Cited

U.S. PATENT DOCUMENTS

| 5,181,258 | A | | 1/1993 | Nagao et al. |
| 5,369,742 | A | * | 11/1994 | Kurosu et al. ................. 715/209 |
| 6,128,102 | A | | 10/2000 | Ota |
| 6,243,713 | B1 | | 6/2001 | Nelson et al. |
| 6,741,743 | B2 | | 5/2004 | Stalcup et al. |
| 6,944,344 | B2 | * | 9/2005 | Imagawa et al. ............... 382/229 |
| 7,079,672 | B2 | | 7/2006 | Matsumoto et al. |
| 7,236,632 | B2 | | 6/2007 | Erol et al. |
| 7,272,269 | B2 | * | 9/2007 | Tojo et al. ..................... 382/305 |

(Continued)

FOREIGN PATENT DOCUMENTS

JP 9270902 10/1997

(Continued)

OTHER PUBLICATIONS

English Translation of Japanese Office Action issued in corresponding Japanese Application No. 2005-211775 mailed on Nov. 30, 2010.

(Continued)

*Primary Examiner* — Hadi Akhavannik
(74) *Attorney, Agent, or Firm* — Gauthier & Connors LLP (57) ABSTRACT

An image search system includes a first calculation section that calculates a first similarity score of each registered image with respect to an input image on the basis of image features of the registered and the input image, a second calculation section that calculates a second similarity score of each registered image with respect to the input image on the basis of text features of the registered and the input image, a candidate extraction section that extracts one or more candidate images on the basis of the first and the second similarity scores of each registered image, a third calculation section that calculates a third similarity score of each candidate image on the basis of projection waveforms of the input image and the candidate image, and a search section that determines one or more registered images similar to the input image on the basis of the third similarity score.

11 Claims, 8 Drawing Sheets

U.S. PATENT DOCUMENTS

| | | | |
|---|---|---|---|
| 7,738,700 B2 * | 6/2010 | Shiiyama | 382/170 |
| 2003/0161504 A1 | 8/2003 | Inoue | |
| 2004/0218836 A1 | 11/2004 | Kanatsu | |
| 2004/0220962 A1 | 11/2004 | Kaneda | |
| 2004/0243601 A1 | 12/2004 | Toshima | |
| 2005/0084154 A1 | 4/2005 | Li et al. | |
| 2005/0125154 A1 | 6/2005 | Kawasaki | |
| 2009/0190834 A1 | 7/2009 | Inoue | |

FOREIGN PATENT DOCUMENTS

| | | |
|---|---|---|
| JP | 10049659 | 2/1998 |
| JP | 11306351 | 11/1999 |
| JP | 2000347659 | 12/2000 |
| JP | 2001005830 | 1/2001 |
| JP | 2001-319232 | 11/2001 |
| JP | 2002007413 | 1/2002 |
| JP | 2002189754 | 7/2002 |
| JP | 2003-091730 | 3/2003 |
| JP | 2003076990 | 3/2003 |
| JP | 2003-281176 | 10/2003 |
| JP | 2003323622 | 11/2003 |
| JP | 2004-139210 | 5/2004 |
| JP | 2004334334 | 11/2004 |
| JP | 2004334338 | 11/2004 |
| JP | 2004334339 | 11/2004 |
| JP | 2005-149071 | 6/2005 |
| JP | 2005165421 | 6/2005 |
| JP | 2005208740 | 8/2005 |

OTHER PUBLICATIONS

Suzuki et al., "A Relevance Score Normalizing Method Using Shannon's Information Measure." Information Processing Society of Japan, vol. 45, No. SIG4, Mar. 2004, pp. 37-49 with translation of abstract only.

The Notice of Grounds for Rejection mailed on Jan. 4, 2011, in connection with corresponding Japanese Application No. 2005-365409 and English translation thereof.

Suzuki et al., "A Selection Algorithm of Mathematical Function for Multimedia Document Retrieval System" papers from the Symposium on Databases and Web Information Systems, Information Processing Society of Japan Symposium Series, vol. 2002, No. 19, Information Processing Society of Japan, Dec. 3, 2002, pp. 367-374.

English Translation of Office Action issued in corresponding Japanese Patent Application Serial No. 2005-365409 mailed on Mar. 29, 2011.

* cited by examiner

IMAGE SEARCH SYSTEM, IMAGE SEARCH METHOD, AND STORAGE MEDIUM

PRIORITY INFORMATION

This application is a divisional of U.S. application Ser. No. 11/441,362, filed on May 25, 2006, which claims priority to Japanese Patent Application Nos. 2005-211775, filed on Jul. 21, 2005 and 2005-365409, filed on Dec. 19, 2005, which are incorporated herein by reference in their entireties.

BACKGROUND

1. Technical Field

The present invention relates to a technology of searching for and retrieving an image which is similar to an input image, from among images registered in a database or the like.

2. Related Art

Recently, in the business world considerable emphasis has been placed on enhanced security of information and handling of information, in view of compliance with regulations or protection of personal information. For example, in response to audits or the like, companies are required to disclose information based on which their business has been performed. It is therefore necessary for companies to record, as log data, and manage the access to their services so that they can specify the person who has processed information, the kind of information and process which have been used, and so on.

In view of such a trend, there has been proposed a system in which, in the event of actions such as output of a document by means of copying, printing, facsimile transmission, or the like, and electronic input of a paper document by means of scanning, image data which are output or input at the time of these actions are stored as log data together with the date, an operator name, and so on, and then, if at a later time data leakage concerning a certain document is suspected, a document which is the same as the certain document is searched through the log data, thereby specifying a source of leakage or the like.

In order to realize the above system, an image corresponding to a target document must be searched and retrieved from the log data. Here, very high operability can be achieved if search can be performed by means of the image itself which is obtained by scanning the target document as a search condition, rather than the user entering detailed information such as a search keyword and so on. For any purposes other than the security purpose described above, it would be similarly advantageous if a user could search through an image database and retrieve an image similar to a scanned image.

SUMMARY

In accordance with one aspect of the invention, there is provided an image search system including a first calculation section that calculates a first similarity score of each registered image with respect to an input image on the basis of image features of the registered image and the input image, a second calculation section that calculates a second similarity score of each registered image with respect to the input image on the basis of text features of the registered image and the input image, a candidate extraction section that extracts one or more candidate registered images on the basis of the first and the second similarity scores of each registered image, a third calculation section that calculates a third similarity score of each candidate registered image on the basis of projection waveforms of the input image and the candidate registered image, and a search section that determines one or more registered images similar to the input image on the basis of the third similarity score of each of registered image.

BRIEF DESCRIPTION OF THE DRAWINGS

These and other aspects of the disclosure will become apparent from the following description read in conjunction with the accompanying drawings, wherein the same reference numerals have been applied to like parts, and in which.

DETAILED DESCRIPTION

Exemplary embodiments of the present invention will be described in detail with reference to the accompanying drawings.

By reference to FIG. 1, a structure of an image search apparatus according to the exemplary embodiment will be described. The image search apparatus searches and retrieves, from among registered images which are registered in an existing image database or image log storage device (not shown), a registered image having a high degree of similarity with respect to an input document image 100. The input document image 100 may be, for example, image data obtained by reading a paper document by a scanner, or a bitmap image obtained by converting an image file created by any of various types of application programs. Upon receiving the input document image 100, the image search apparatus supplies the input image document 100 to each of a photograph image search section 10 and a text search section 20.

The photograph image search section 10 is a section which performs search processing suitable for a continuous tone image such as a photograph. The photograph image search section 10 may divide an input image into multiple blocks and performs image search on the basis of the degree of similarity concerning an image feature amount for each block. The photograph image search section 10 may typically be implemented by executing a program by a computer.

Figure 2:
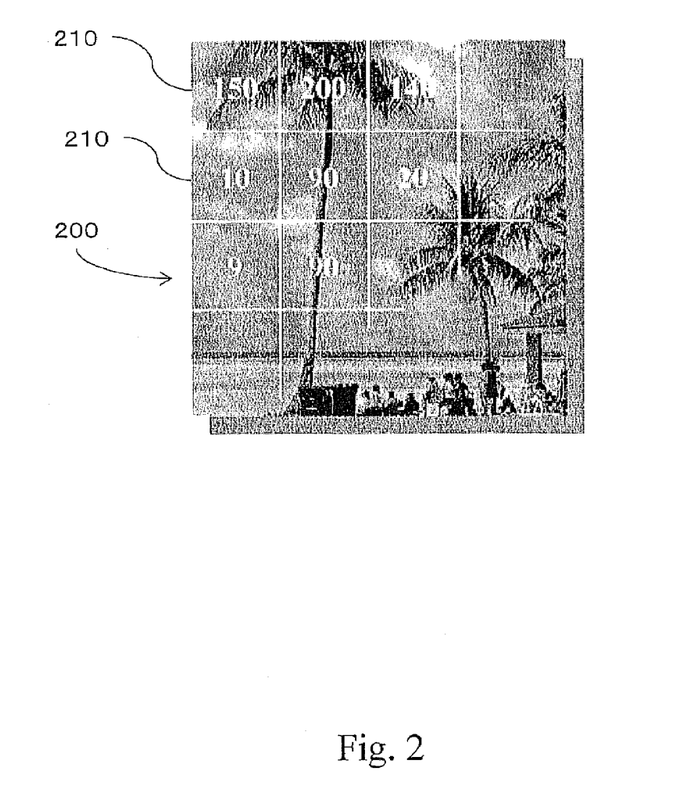
FIG. 2 is a view for explaining photograph image search.

An image feature amount extraction section 12 of the photograph image search section 10 extracts an image feature amount of the input document image 100. As the image feature amount, a two-dimensional distribution of edge amounts may be used, for example. More specifically, as shown in FIG. 2, an image 200 of a predetermined size is divided into a predetermined number (e.g., 8×8, 16×16, 32×32) of blocks 210 of a predetermined size. An edge extraction filter is then applied to the image 200 to calculate an edge amount for each block 210, and a combination; i.e. a distribution of the edge amount of each blocks 210, is obtained as the image feature amount. This method which uses the edge amount distribution is suitable for a photograph image captured by a digital camera or the like. Alternatively, it is also possible to obtain an average color, rather than the edge amount, for each block and use a combination (or distribution) of the average color of each block as the image feature amount. In addition, it is further possible to binarize an image and obtain a distribution of a ratio of black pixels in each block 210 as the image feature amount. As such, various types of image feature amounts and corresponding scoring methods have been conventionally proposed, and the photograph image search section 10 may use any of these image feature amounts and the corresponding scoring methods. Further, distribution of contour line features or frequency features obtained for each block, may be used as the image feature amount for matching. In addition, any combination of two or more image feature amounts described above may be used for image matching.

Here, the above-described image feature amounts for use in the photograph image search section 10 have a comparatively simple algorithm and may therefore be calculated at high speed even with software processing. Further, calculation of such an image feature amount and matching processing using the image feature amount may also be implemented by a hardware circuit and is therefore suitable for high-speed processing.

A feature amount matching section 14 calculates a degree of similarity between the image feature amount (or a combination of multiple image feature amounts) of the input document image 100 which is obtained by the image feature amount extraction section 12 and the image feature amount (or a combination of multiple image feature amounts) of each registered image stored in the image database or image log (both not shown). The image feature amount of each registered image has been calculated using the same algorithm as used in the image feature extraction section 12 and is then registered in a feature amount DB (database) 30 at the time of registering each image in the image database or the image log. Specifically, the image feature amount (such as a distribution of edge amounts described above) of each registered image is registered in the feature amount DB 30 in association with a document ID (identification information) of the registered image. The feature amount matching section 14 calculates, for each registered image, a similarity score indicative of the level of similarity between the image feature amount of the registered image and the image feature amount of the input document image 100. The similarity score may be calculated by means of a conventionally known method.

As described above, the photograph image search section 10 calculates and outputs, for each registered image, a similarity score (i.e. a score based on the image feature amount) of the registered image with respect to the input document image 100. This similarity score is represented as a first score 110 in FIG. 1. As such, the photograph image search section 10 outputs, for each registered image, a pair consisting of the document ID of the registered image and the first score 110, for example, which is then supplied to a candidate extraction section 50.

The text search section 20 will next be described. The text search section 20 is a section for searching for a similar registered image using the feature of a text character string existing in the input document image 100, and is typically implemented by execution of a computer program. The text search section 20 includes a character recognition section 22, a word extraction section 24, and a search processing section 26.

The character recognition section 22 recognizes characters contained in the input document image 100 by means of an OCR (optical character recognition) algorithm or an OCR circuit. Here, conventional OCR algorithms or OCR circuits may be used.

The word extraction section 24 performs known natural language analysis such as morphologic analysis with respect to a character string which is output from the character recognition section 22, to thereby extract words appearing in the input document image 100. Thus, the word extraction section 24 outputs data concerning a set of words contained in the input document image 100, for example. Preferably, the data concerning the set of words include, for each word, information concerning the number of times the word appears within the input document image 100. Further, words to be extracted may be limited to specific word classes (for example, to nouns only).

The search processing section 26 searches through a text DB 40 using the set of appearing words obtained by the word extraction section 24 and calculates the similarity score of each registered image with respect to the input document image 100.

Here, a list of document IDs of registered images in each of which a certain word appears is registered in the text DB 40, with each word being used as an index. The text DB 40 may be created as follows. Specifically, at the time of registering an image of each registered image in the image database, the log, or the like, character recognition and word extraction are performed concerning each registered image, and the document ID of the registered image is registered in a column of the text DB 40 having a word which is extracted as an index. Here, in view that a single word is highly likely to appear a plurality of times in a registered image, preferably, in addition to simple registration of the document ID in association with each index word, the number of times the word appears in the registered image may be also registered.

The similarity score is calculated by reference to the text DB 40 in the following manner, for example. Specifically, the text search section 20 searches through the text DB 40 using each word extracted by the word extraction section 24 as a key, and obtains, for each word, a pair consisting of the document ID of the registered document in which the word appears and the number of times the word appears. Here, there are of course cases where multiple pairs consisting of the document ID and the number of appearance are obtained for a single word. Then, for each word, a score is added to the document ID of the registered document in which the word appears, on the basis of the thus-obtained information.

With the above calculation, the information concerning a pair consisting of the document ID and the number of times of appearance which is obtained for each word is organized for each document ID, for example, so that, for each registered image there is obtained a pair consisting of a word appearing in the registered image and the number of times the word appears. Then, a difference in the number of times each word appears between the input document image 100 and each registered image is calculated, and a sum (or a sum of squares, a root mean square, and so on) of the absolute value of the difference is further calculated for each registered image. Here, the calculation result is "0" if the input document image 100 is identical with the registered image, whereas the value of the calculation result increases with the difference between the input document image 100 and the registered image. Accordingly, by using the calculation result with the sign being inverted as a similarity score of the corresponding registered image, it is possible to set the similarity score such that the value of the score becomes greater with the similarity between the registered image and the input document image 100 as a text. The above-described calculation is performed for all the registered images registered in the image database or the image log.

Although in the above example case calculation is performed for all the registered documents registered in the image database or the image log, the present invention is not limited to the above case, and it is also possible to perform calculation only with respect to documents which satisfy a predetermined condition. Such a condition for narrowing calculation targets can be designated as a range of date and time when a registered image was registered in the image database or the image log, a group to which a user who has registered a registered image belongs, and so on. More specifically, it is possible to perform calculation with respect to only documents which are registered in the designated range of date and time or only documents which are registered only by users who belong to the designated groups, for example. Such a narrowing condition may be designated by a user via a user interface of the image search apparatus.

The search processing section 26 outputs pairs consisting of the document IDs of the registered documents and the similarity scores (a second score 120 shown in FIG. 1) thus obtained for all the registered documents. The output data are then supplied to the candidate extraction section 50.

The text-based similarity score calculation method is not limited to the above example method performed by the text search section 20. In the field of text search, there have conventionally been developed various types of methods for obtaining a search score indicative of the degree of matching of each registered document with respect to a search condition represented by a keyword group or a logical expression of a keyword. Any of these conventional methods may of course be adopted as a method for use in the text search section 20 of the present embodiment.

Here, the text search according to the present embodiment has characteristics concerning a search purpose which are different from those of a general keyword-based document search. Specifically, keyword search is basically intended to search for a document containing a certain keyword therein, and a keyword and a document to be searched are separate items. In contrast, in leakage verification, which is one of the search purposes of the present embodiment, a target which is basically the same as or very similar to the input item is to be searched, such as by searching for a registered image corresponding to one or more pages which is completely the same as or very similar to an image corresponding to one or more pages (i.e. the input document image 100). Accordingly, in the search of the present embodiment, by considering not only the number of times each word appears in an image but also the position in the image where each word appears, precision in search can be further increased. An example of such a search method will be described.

Figure 3:
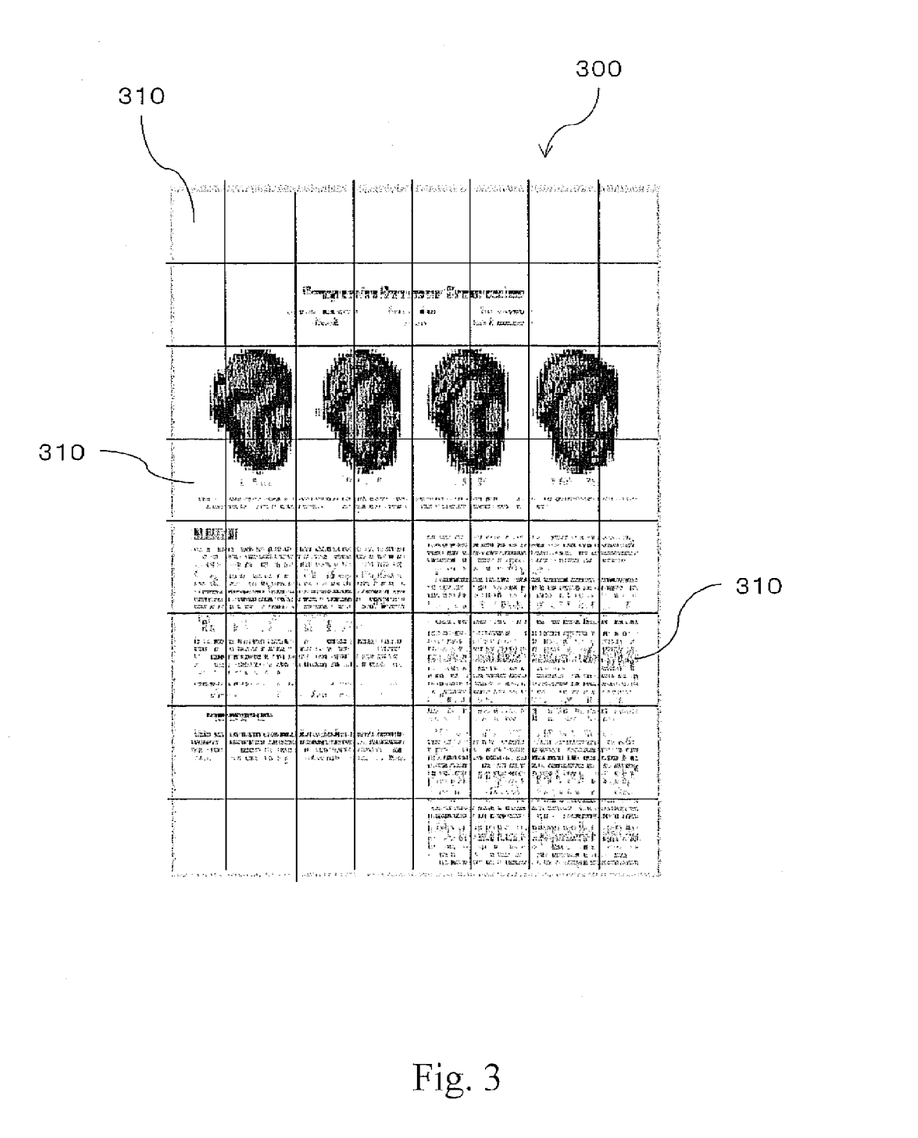
FIG. 3 is a view for explaining similar text search taking into consideration the position where a word appears.

According to this method, an image 300 is first divided into multiple blocks 310, as shown in FIG. 3. In the illustrated example, the image 300 is divided into 64 blocks (8 in the vertical direction×8 in the horizontal direction). Then, for each word extracted from the image, the block to which a first character of the word belongs is designated as the position where that word appears. In this method, for each index word, a list including the document ID of the registered image and the position within the image where the word appears (such as a block number) is registered in the text DB 40. For searching, a higher similarity score is assigned to a registered image in which the same word as that extracted from the input document image 100 appears at the same position as the position in the input document image where the word appears, whereas a lower similarity score is assigned in other cases (i.e., a case where a word extracted from the input document image 100 does not appear at the same position in the registered image, where the word in the registered image is not located at the same position within the input document image 100, and so forth). As a specific example, concerning each word in the input document image 100, there is obtained a ratio of the number of instances where the word appears at the same position in both the input image and each registered image to the total number of positions obtained by adding the number of positions where the word appears in the input document image 100 and the number of positions in a registered image where the word appears (when the word appears at the same position in both images, the position is counted as one). Then, twice a reciprocal of (this ratio+1) is used as a coefficient, and a difference in the number of times the word appears between the input document image 100 and the registered image as described above is multiplied by this coefficient. Subsequently, an absolute value of the multiplication result is added for all the words appearing in the input document image 100 and the registered image to obtain a sum (or, for example, a root mean square). A sign of the result is then inverted to thereby obtain a similarity score. It should be noted that the above method is only an example method in which the position where a word appears is reflected in the similarity score, and any of other various methods may be used.

Although in the above example a word is extracted from the character recognition result, it is not always necessary to perform such a refined analysis for obtaining the individual words, and it is possible to obtain each partial character string appearing in the character recognition result and perform the same process as described above with respect to the partial character string.

The text search section 20 described above has an advantage that the search speed is relatively high, and higher search precision can be obtained when a document image contains a large amount of text. With regard to a document image from which text cannot be extracted or a document image from which only a small amount of text can be extracted, however, high search precision cannot be obtained. As such, there exists a type of document image which is inappropriate for search by the text search section 20.

The processing performed in the photograph image search section 10 and the processing performed in the text search section 20 described above may be performed simultaneously in parallel or may be performed sequentially performed one at a time.

The candidate extraction section 50 combines the first score 110 output from the photograph image search section 10 and the second score 120 output from the text search section 20 to calculate a combined score which is a total evaluation of the image feature and the text feature. The candidate extraction section 50 then extracts registered images having higher-ranked combined scores as candidates for search targets to be used in a subsequent document image search section 52.

Figure 1:
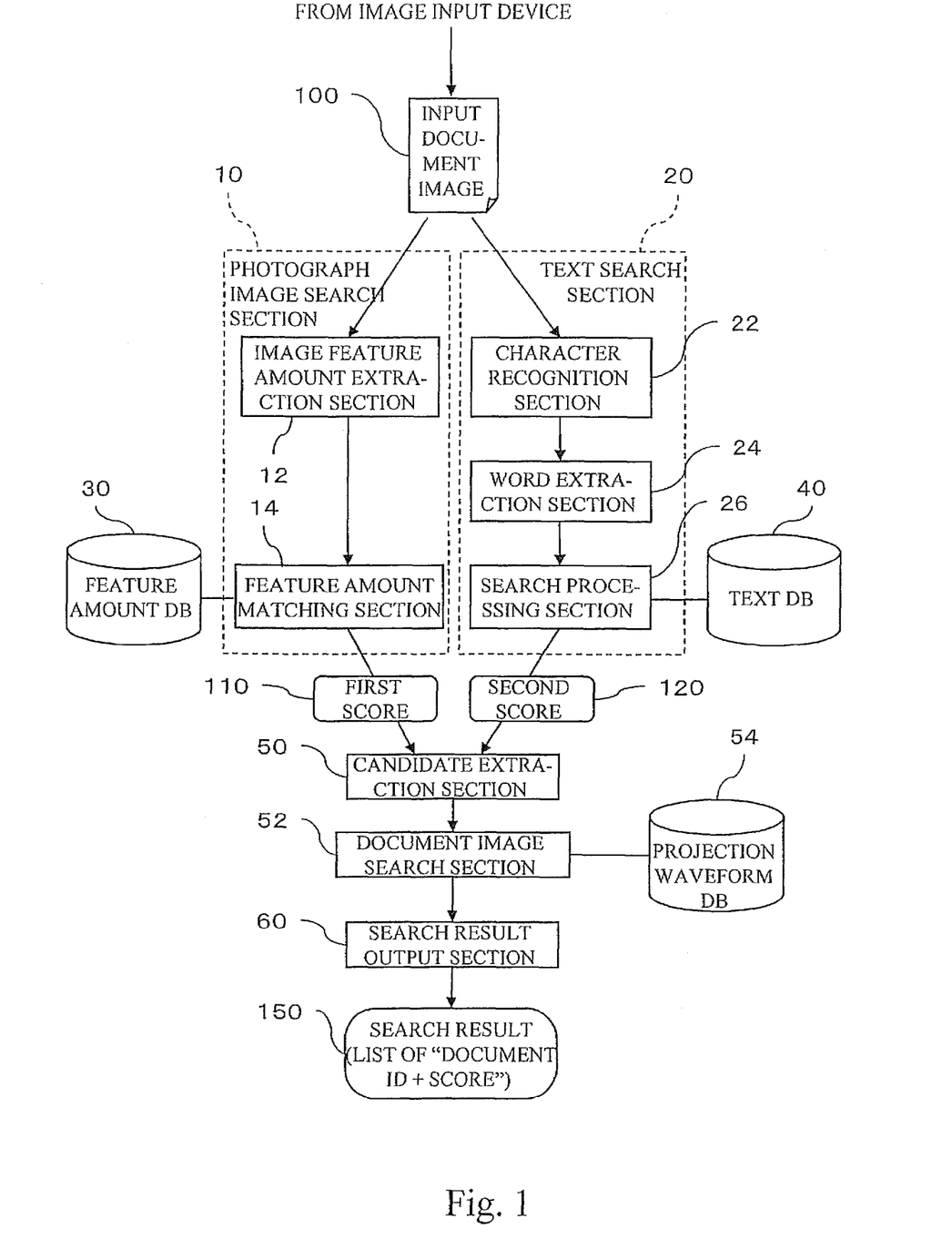
FIG. 1 is a functional block diagram showing a structure of an image search apparatus according to one embodiment of the present invention.

Here, the apparatus shown in FIG. 1 adopts a concept of statistical normalization in order to combine the similarity score based on the image feature and the similarity score based on the text feature having considerably different characteristics. Specifically, because these similarity scores are different measures, it is highly possible that an appropriate score cannot be obtained by simply comparing these scores or directly applying operations such as summation, multiplication, and so on to these scores. Therefore, according to the present embodiment, such a raw similarity score is normalized to a value indicative of the position of each registered image among a whole set of registered images. A method for normalization in which the similarity score of a registered image is converted into a deviation value of all the registered documents can be described as an example method. This method will be described with reference to a flowchart shown in FIG. 5.

Here, there is considered a similar image search system in which a group of images similar to a certain image a (an input document image 100) is selected from among a certain group of images (a group of registered images) G={$G_1$, $G_2$, $G_3$, ..., $G_n$}, and the selected images are arranged in descending order of similarity and output. The similarity score of each image $G_i$ (i=1, 2, 3, ..., n) in the group of registered images using various feature amounts $F_j$ (j=1, 2, 3, ..., m) with respect to the input image a is taken as $S_{ij}(a)$. The feature amount $F_j$ may be an image feature amount such as an edge amount distribution, a text feature amount based on the number of times of word appearance, and so on. The similarity score $S_{ij}(a)$ of each registered image $G_i$ with regard to each feature amount $F_j$ can be obtained as the processing result performed by the photograph image search section 10 and the text search section 20 described above.

Figure 5:
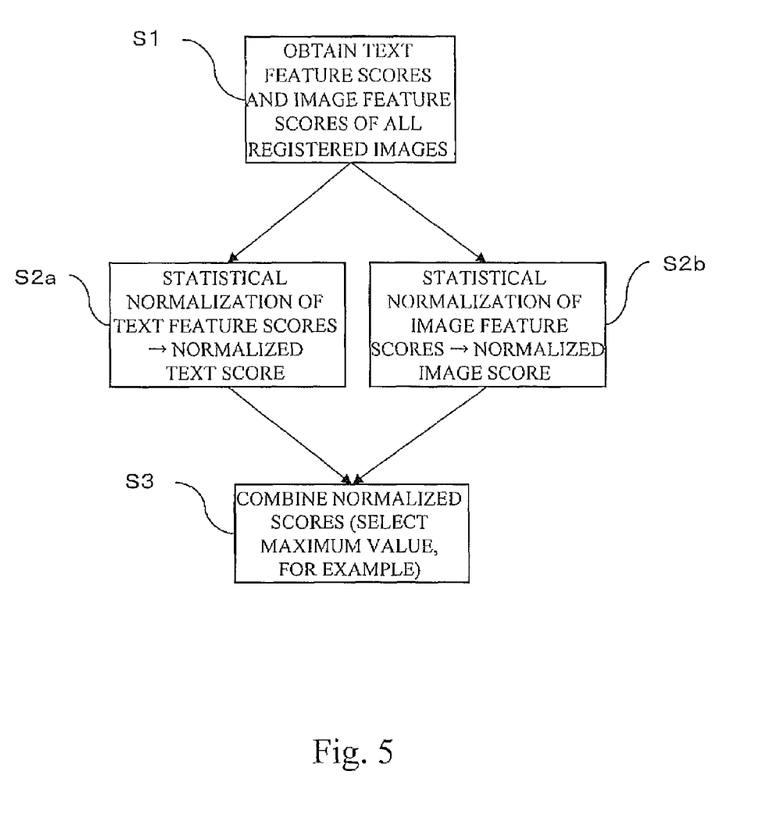
FIG. 5 is a flowchart showing a process procedure performed by a candidate extraction section.

The candidate extraction section 50 then computes a deviation value $Z_{ij}(a)$ which is obtained by normalization of each score $S_{ij}(a)$ for each type of feature amount j. This calculation may be performed on the basis of the following expression.

$$Z_{ij}(a) = \frac{S_{ij}(a) - \overline{S_j(a)}}{D_j(a)} \quad \text{Expression (1)}$$

$$\overline{S_j(a)} = \frac{\sum_{i=1}^{n} S_{ij}(a)}{n}$$

$$D_j(a) = \sqrt{\frac{\sum_{i=1}^{n} (S_{ij}(a) - \overline{S_j(a)})^2}{n-1}}$$

Here, $$\overline{S_j(a)}, D_j(a), Z_{ij}(a) \quad \text{Expressions (2)}$$

represent an average value, a standard deviation, and a deviation value, respectively, of the similarity $S_{ij}(a)$ of a registered image $G_i$ with respect to the input image a, when the feature amount $F_j$ is used.

In the example shown in FIG. 1, a deviation value of the similarity score of each registered image based on the text feature among all the registered images is obtained and set as a normalized text score (S2a), while a deviation value of the similarity score of each registered image based on the image feature among all the registered images is obtained and set as a normalized image score (S2b).

By using the deviation value $Z_{ij}(a)$ as a score as described above, it is possible to compare values of similarity scores which use different feature amounts. In this case, however, it should be assumed that the number of registered images is sufficiently large and that the distribution of similarity scores of the registered images concerning the same feature amount $F_j$ represents a distribution which is close to a normal distribution. Such an assumption is often considered to be appropriate if the registered images include various types of images such as text documents, drawings, photographs, any combinations of these images, and so on, and if they are sufficiently large in number.

Once the similarity score concerning each feature amount $F_j$ is normalized as described above, the candidate extraction section 50 combines the normalized scores concerning the respective feature amounts for the same registered image to thereby calculate a combined score concerning the registered image (S3). Given that a combined score of a registered image $G_i$ with respect to an input image a is $S_i(a)$, the combined score $S_i(a)$ can be obtained according to the following expression:

$$S_i(a) = f(Z_{i1}(a), Z_{i2}(a), Z_{i3}(a), \ldots, Z_{im}(a)) \quad \text{Expression (3)}$$

Here, f represents a function for obtaining a combined score from a deviation value $Z_{ij}(a)$ concerning each feature amount $F_j$. A function which adopts the maximum value among each term of variables can be used as such a function f. As described above, there is a difference in levels of identification for various feature amounts of an image among different types of images. Specifically, when a feature amount which can provide a high level of identification with respect to the type of an input image a is used, the similarity score of a registered image which is identical with or very similar to the input image becomes high, whereas the similarity score of a registered image which is different from the input image a becomes considerably low. Consequently, the deviation value obtained from such a similarity score with regard to a registered image which is identical with or very similar to the input image a will be specifically larger than that for other registered images. On the contrary, when a feature amount which provides only a low level of identification with respect to the type of an input image a is used, there is no noticeable difference between the similarity score of a registered image which is identical with or very similar to the input image a and the similarity score of other registered images. Consequently, the deviation value obtained by conversion of such a similarity score with regard to a registered image which is identical with or very similar to the input image a is not very large. Accordingly, by using, as the function f, a function which adopts the maximum value among the normalized scores $Z_{ij}(a)$ (deviation values) concerning the respective feature amounts $F_j$, the combined score will have a very high value with regard to a registered image which is identical with or very similar to an input image a and will have a much smaller value with respect to other registered images (regardless of which deviation value of those concerning various feature amounts is adopted as the maximum value) than that for a registered image which is identical with or very similar to an input image a. Thus, the combined score which is obtained according to the above-described method can be considered to be very suitable for the purpose of searching for a registered image which is identical with or very similar to an input image which may be of any of a variety of different types.

Further, other functions which adopt arithmetic mean or geometric mean of each term of variables may also be used as the function f.

An advantage of the above-described score combination processing is that by assuming a group of registered images $G_i$ to be searched to be a sample set, normalization of scores, which has been impossible in the case of comparison with a single registered image, can be achieved, and a combined similarity score with a certain degree of high appropriateness can be provided without requiring detailed knowledge concerning the feature amount $F_j$ and the corresponding similarity score. In a case where only a single registered image is considered (which corresponds to a case where the number of images in the group of images $G_i$ is one), it may be considered that similarities concerning features having completely different evaluation criteria or characteristics, such as text and image density, are used with no correction or that a probable model used for combining these similarities is produced to carry out a parameter evaluation. However, in the former case, it is not possible to obtain a score with a high level of appropriateness, whereas the latter case, which requires the detailed knowledge at least concerning the feature amount $F_j$ and the corresponding similarity, is difficult to carry out when various types of images are to be searched.

Documents which are actually used in company activities include a wide range of different types of documents, such as a document having a fixed layout and containing letters almost exclusively, such as a patent specification; a document having a fixed format composed of letters and lines, such as a name list or other types of lists created by use of a spreadsheet program; a document having a high degree of similarity in layout such as a reference material for presentation created by use of a specific template; a document composed mostly of figures with few letters, such as a presentation material having a lot of figures, or patent drawings; a pamphlet having almost an entire page of photographs; a pamphlet including a combination of photographs and text; and so on. Accordingly, it is extremely difficult to provide a general-purpose model which can be applied to these different documents. On the other hand, an appropriate combined score can be obtained with the score combination of the present embodiment, score calculation sections based on a variety of feature amounts, such as a score calculation section using a feature amount which provides a high level of identification for text documents, a score calculation section using a feature amount which provides a high level of identification for photographs, a score calculation section using a feature amount which provides a high level of identification for drawings, and so on, are combined, and the resulting score obtained in each section is normalized and then combined.

Here, the similarity scores to be combined may be obtained based on aspects having low relative correlation with each other. For example, when the text-based score described above is used together with a score obtained based on the feature of the edge amount distribution or the average color distribution, which provides a high level of identification with respect to photographs, it is possible to perform search with high precision with respect to both text documents and photographs.

In the above example, the photograph image search section 10 and the text search section 20 supply the similarity scores concerning all the registered images to the candidate extraction section 50. Alternatively, it is also possible to supply to the candidate extraction section 50 only the similarity scores concerning registered images which are equal to or greater than a predetermined value. In this case, the candidate extraction section 50 may set the similarity scores concerning registered images which the candidate extraction section 50 has not received to a predetermined value such as "0," and may then perform the above-described score combination processing.

In this manner, the candidate extraction section 50 calculates, for each registered image, a combined score indicative of a degree of similarity of the registered image with respect to an input image a (the input document image 100).

The candidate extraction section 50 then sequentially selects, as a candidate for search to be performed in the subsequent document image search section 52, a registered image in descending order of the combined score thus obtained. Stated differently, the candidate extraction section 50 performs the first narrowing of candidates among the group of registered images stored in the document image database or the document image log storage device (not shown). When candidates are extracted, a predetermined number of registered images having combined scores of higher rank may be sequentially extracted, or registered images having higher-ranked combined scores corresponding to a predetermined ratio with respect to all the registered images may be extracted. It is also possible to extract a registered image having a combined score which is equal to or greater than a threshold value. Of course, the above-described methods of extracting candidates are merely examples, and other conditions may be used for sequentially extracting a registered image in descending order of the combined score. The candidate extraction section 50 provides the document ID of each candidate thus extracted to the document image search section 52. Here, in order for the document image search section 52 to perform search in consideration of the combined score, the candidate extraction section 50 provides both the document ID and the combined score of each candidate to the document image search section 52.

It should be noted that the method of calculating the combined score as illustrated above is a mere example and the combined score may be calculated according to other methods.

Figure 4:
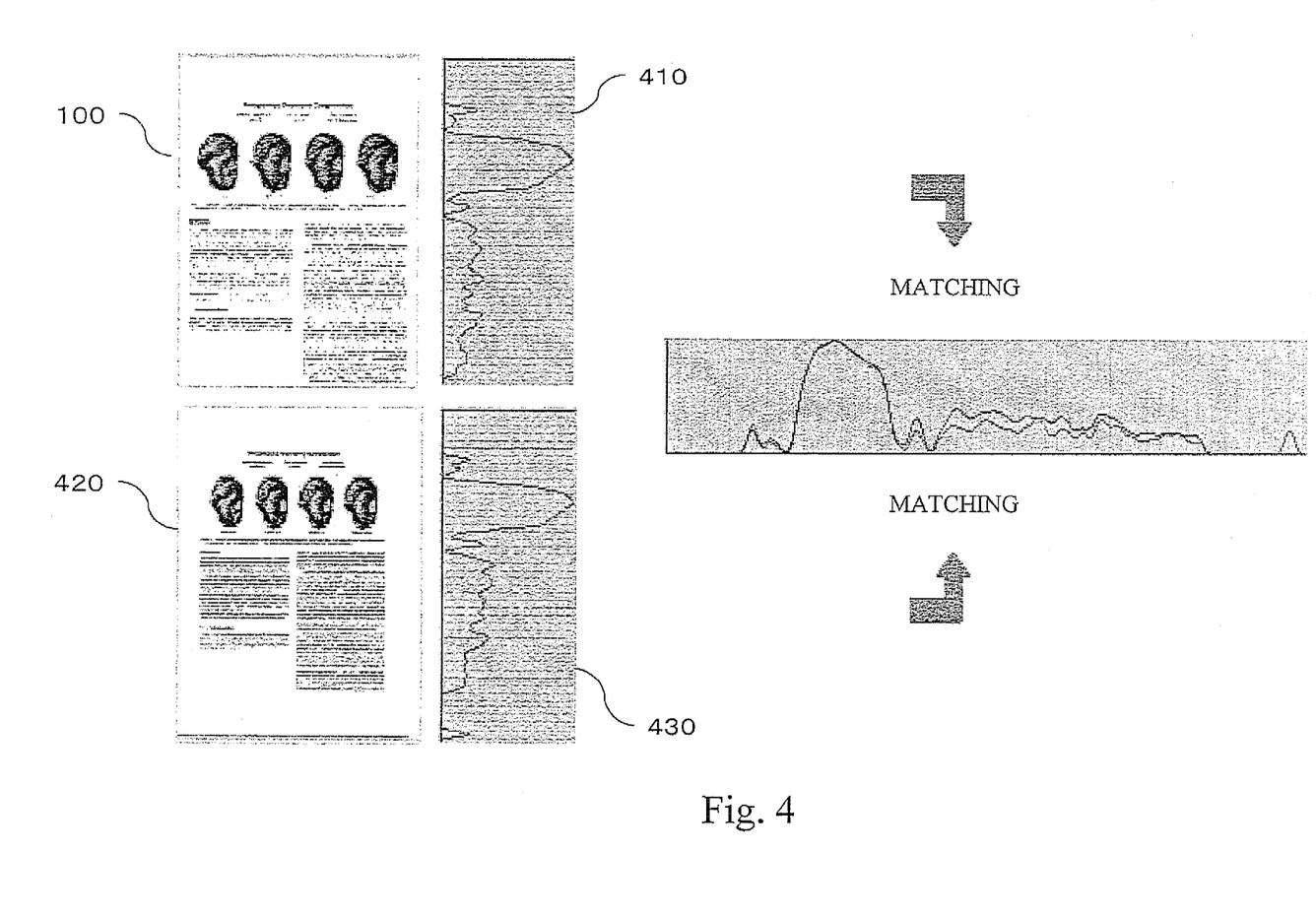
FIG. 4 is a view for explaining processing for calculating a similarity on the basis of a projection waveform of an image.

The document image search section 52 searches for a registered image having a high degree of similarity with respect to the input document image 100 within a group of candidates which are received, by means of matching processing using a projection waveform of an image. Briefly summarized, as shown in FIG. 4, a projection waveform 410 in the horizontal direction is obtained by projection of each pixel value of the input document image 100 in the horizontal direction; i.e. by adding each pixel value along the same single row in the horizontal direction, and providing a distribution of the addition result in each row in the column (vertical) direction. A projection waveform obtained by projection in the vertical direction may also be used as an image feature amount in place of the projection waveform in the horizontal direction described above, or a pair consisting of the projection waveform in the horizontal direction and the projection waveform in the vertical direction may be used as an image feature amount. Further, the direction of projection is not limited to the horizontal direction and the vertical direction.

For calculation of the similarity score using a projection waveform, with regard to the projection waveform 410 obtained from the input document image 100 and a projection waveform 430 of a registered image 420 which is registered in a projection waveform DB 54, after matching the scales and positions between these projection waveforms, a correlation function indicative of the strength of correlation between these waveforms or differential waveforms is obtained and is assigned as a similarity score. The projection waveform information for all the registered images is registered in the projection waveform DB 54, and the document image search section 52 reads out the projection waveform information of each candidate extracted by the candidate extraction section 50 for comparison with the projection waveform 410 of the input document image 100. When the projection waveforms in both the horizontal and vertical directions are used, a sum or an average, for example, of the similarity score concerning the waveform in the vertical direction and the similarity score concerning the waveform in the horizontal direction may be used as a final similarity score. In addition, various methods for determining a similarity based on a projection waveform may be used.

Because the matching and search method based on a projection waveform as described above generally achieves a high level of precision and provides analysis with regard to a feature which is different from those handled by the photograph image search section 10 and the text search section 20, this matching and search method may be combined with both the search sections 10 and 20, thereby similarity evaluation from different aspects may be provided. On the other hand, because this method imposes a great burden on the operation processing, it requires time for operation or requires the use of an operation device with an extremely high level of performance. According to the present embodiment, however, because this matching processing is performed only with respect to the candidates previously narrowed down by the candidate extraction section 50, the operation time or the operation performance is not significant.

The document image search section 52 obtains a similarity score based on a projection waveform for each candidate as described above, and outputs a list listing a pair consisting of the document ID of each candidate and the corresponding similarity score, in descending order of similarity score. Here, the list to be output may include only a predetermined number of documents with high-ranked similarity scores or only the documents whose similarity scores are equal to or greater than a predetermined value.

Further, it is also possible to add the combined score obtained in the candidate extraction section 50 to the similarity score based on a projection waveform which is obtained by the document image search section 52 to thereby obtain a second combined score, rank each candidate in accordance with the second combined score, and create a list of the candidates according to this ranking. The second combined score can be calculated by performing the above-described normalization with respect to the similarity score based on a projection waveform and then combining the value of normalized result and the combined score obtained from the candidate extraction section 50 as described above.

A search result output section 60 receives the list thus created from the document image search section 52, sorts the listed registered images in descending order of combined score value, and outputs them as search results. In this manner, it is possible to provide a search result 150 in which the registered images are arranged in descending order of similarity with respect to the input image a.

According to the above-described system shown in FIG. 1, the photograph image search section 10 and the text search section 20, both capable of comparatively high-speed processing, are first used to extract, as candidates, registered documents which are comparatively similar to the input image from among all the registered images. Then, the document image search section 52, which provides comparatively high accuracy but requires time for operation, performs search with respect to the candidates thus narrowed down to thereby obtain the final search result. With this structure, it is possible to achieve high-speed search with high precision, with the time and ability required for the whole operation being reduced.

In the present embodiment, the photograph image search section 10, which can perform high-speed search with generally high precision and provide a lower level of identification only with regard to a few types of documents, is used for narrowing down the candidates in the former stage of the structure shown in FIG. 1, thereby achieving high-speed narrowing of candidates. Further, the text search section 20, which can operate at comparatively high speed and achieves high-precision search when the text amount is large, is also used for narrowing down the candidates in the former stage of the structure shown in FIG. 1, thereby achieving high-speed narrowing of candidates. Although the text search section 20 cannot achieve search of high precision with respect to an image having a small amount of text, the photograph image search section 10 provided in parallel can compensate for the search with respect to such an image with a small amount of text.

The matching processing based on a projection waveform which is performed by the document image search section 52 provided in the latter stage is advantageous in that even when an image formed by including a note or a stamp added to a registered image is input, the corresponding registered image can be searched with high precision. More specifically, because an area ratio of these notes and stamps is generally small with respect to the whole page, effects of these notes or the like on the whole image is small when they are represented in the form of a projection waveform. It is therefore possible to obtain an accurate, high similarity score by comparing the projection waveforms between such an input image and the registered image. In contrast, with the matching processing based on an edge amount distribution or the like performed by the photograph image search section 10, the similarity score may be considerably lowered due to the effects of such notes or stamps. Thus, there are cases where the document image search section 52 can search for a document image having a high level of similarity more appropriately than can the photograph image search section 10. In particular, as stamps and notes are often added to an original document for the purpose of monitoring leakage of documents in business, the document which is actually leaked often includes such stamps and notes, which the original documents do not include. Consequently, it is of a great significance to adopt the document image search section 52 as a part of the search mechanism.

Although the document image search section 52 can only achieve comparatively low-speed processing, according to the present embodiment, the disadvantage of such a low-speed operation can be compensated for by allowing the document image search section 52 to perform processing only with respect to the candidates which have been narrowed down by the high-speed search sections 10 and 20.

Figure 6:
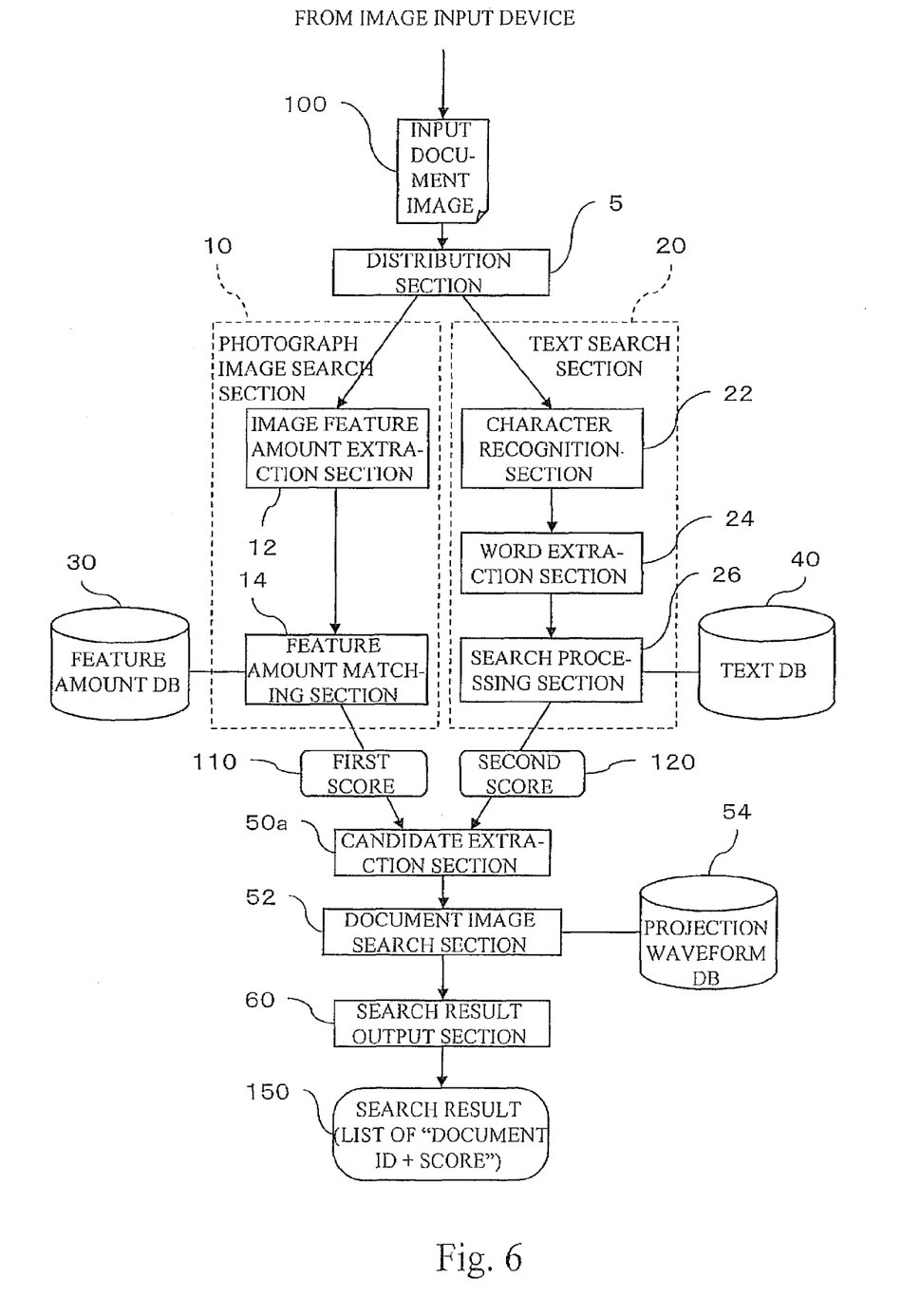
FIG. 6 is a functional block diagram showing a structure of a modified example image search apparatus.

Referring now to FIG. 6, another example will be described. In FIG. 6, elements which are identical with or similar to those shown in FIG. 1 are designated by the same numerals, and their descriptions will not be repeated.

The image search apparatus of this example includes a distribution section 5 before the photograph image search section 10 and the text search section 20. The distribution section 5 analyzes the input document image 100 to determine whether the input document image 100 has a property suitable for search performed by the photograph image search section 10 or the text search section 20 and selectively distributes the input image 100 to the suitable search section.

Here, the distribution section 5 applies to the input document image 100 auto separation processing (also referred to as text/image separation processing) which is known for copying machines and scanners, for example, to thereby divide the image 100 into a text region and a (photograph) image region. Then, the distribution section 5 supplies the image 100 to the text search section 20 when the text region is larger than the image region, and supplies the image 100 to the photograph image search section 10 when the image region is larger than the text region. A candidate extraction section 50*a* then receives a list of scores of the registered images obtained by the selected one of the photograph image search section 10 and the text search section 20 and extracts a group of registered images with higher scores as candidates to be supplied to the document image search section 52. The document image search section 52 may perform processing which is similar to that performed in the apparatus shown in FIG. 1.

Here, when a difference in size is small between the text region and the image region, there is a possibility that selective use of one of the search sections 10 and 20 cannot provide sufficient precision for narrowing down the candidates. Accordingly, when the difference in size between the text region and the image region is equal to or less than a predetermined threshold value, the input image may be supplied to both the search sections 10 and 20 and the scores obtained by both search sections may be combined by the candidate extraction section 50a, thereby extracting the candidates on the basis of the resulting combined score.

Although in the above example one of the search sections 10 and 20 to be used is selected on the basis of size comparison between the text region and the image region, the selection method is not limited to this example. For example, because the precision of search performed by the text search section 20 depends largely on the number of characters contained in the image, the distribution section 5 may count the number of characters contained in the input document image 100 and distribute the input image on the basis of the information concerning the number of characters. In general, the precision of search by the text search section 20 increases with the number of characters. It is therefore possible to adopt a structure in which the distribution section selects the text search section 20 if the number of characters which is obtained exceeds a predetermined threshold value, and the distribution section 5 selects the photograph image search section 10 in other instances. For example, the text search section 20 cannot achieve sufficient precision with respect to an image with a small amount of text, whereas the photograph image search section 10 can perform search with a certain degree of precision even with respect to an image which is composed of only text. Accordingly, when an input document contains a small number of characters, the photograph image search section 10 can be selected such that extraction of candidates can be performed while a certain degree of search precision is maintained.

Further, it is also possible to set a first threshold value, and a second threshold value which is smaller than the first threshold value, with regard to the number of characters and perform control such that the text search section 20 is selected when the number of characters contained in the input document image 100 exceeds the first threshold value and the photograph image search section 10 is selected when the number of characters is smaller than the second threshold value. In this case, when the number of characters falls between the first threshold value and the second threshold value, the input document image 100 may be supplied to the both search sections 10 and 20 and then the scores obtained by these search sections may be combined in the candidate extraction section 50a.

Here, the number of characters contained in the input document image 100 can be obtained by performing character recognition processing such as OCR in the distribution section 5 and then counting the number of characters thus obtained. At this time, it is sufficient to know only the number of characters, and discriminating the individual characters is not yet necessary. Thus, it is not necessary to perform complete character recognition processing at this stage, and the only requirement at this stage is segmentation of the individual characters. By allowing the text search section 20 to use the data concerning this character segmentation result, the character recognition section 22 of the text search section 20 need not be provided with a function of a part of the character recognition processing which is performed by the distribution section 5. Alternatively, the distribution section 5 can also be configured to perform the complete character recognition processing, such that the text search section 20 need not include the character recognition section 22.

Further, instead of determination based only on the number of characters contained in the input document image 100 as described above, it is also possible to further obtain a ratio of the image region (the continuous tone image portion) with respect to the whole page using the image separation described above and combine the obtained ratio of the image region with the number of characters, thereby determining which of the search sections 10 and 20 is more appropriate for search concerning the input document image 100. For example, it is possible to determine that the text search section 20 is more appropriate when the number of characters is greater than a first predetermined threshold character number value and the ratio of the image region is smaller than a first predetermined threshold region value, and determine that the photograph image search section 10 is more appropriate when the number of characters is smaller than a second predetermined threshold character number value (which is smaller than the first threshold character number value) and the ratio of the image region is greater than a second predetermined threshold region value (which is greater than the first threshold region value). In cases other than the above two cases, the input document image 100 can be supplied to both the search sections 10 and 20 and the candidate extraction section 50a can extract candidates on the basis of the result obtained by combining the similarity scores provided by the search sections 10 and 20.

Further, in this modified example, as the input document image 100 is supplied to an appropriate one of the photograph image search section 10 and the text search section 20 due to distribution by the distribution section 5, there are cases where a sufficiently high similarity score can be obtained by search performed by either of the photograph image search section 10 and the text search section 20. Accordingly, when a registered image having a similarity score which is higher than a predetermined value (which has been individually determined for each of the photograph image search section 10 and the text search section 20) can be obtained as a result of search performed by the photograph image search section 10 or the text search section 20, it is possible to eliminate the search performed by the document image search section 52 provided at the subsequent stage and output the registered image having such a similarity score exceeding the threshold value as the search result.

The above structure is advantageous in the following respect. Specifically, precision of the search processing based on a projection waveform is poor with regard to an image for which a peak unique to a projection waveform does not appear, such as an image containing background. Accordingly, even if a very high similarity score can be obtained with regard to a certain registered image in the photograph image search section 10 or the text search section 20, the similarity score of this registered image which is obtained in the document image search section 52 can be low if the type of the registered image is not suitable for the search based on a projection waveform. However, by adopting the above-described control method in which the search performed by the document image search section 52 provided in the subsequent stage is skipped when a very high similarity score can be obtained by the photograph image search section 10 or the text search section 20, the need for performing an unnecessary operation processing can be eliminated and a risk of adversely affecting the reliable search result by inappropriate search technology can be reduced.

Figure 7:
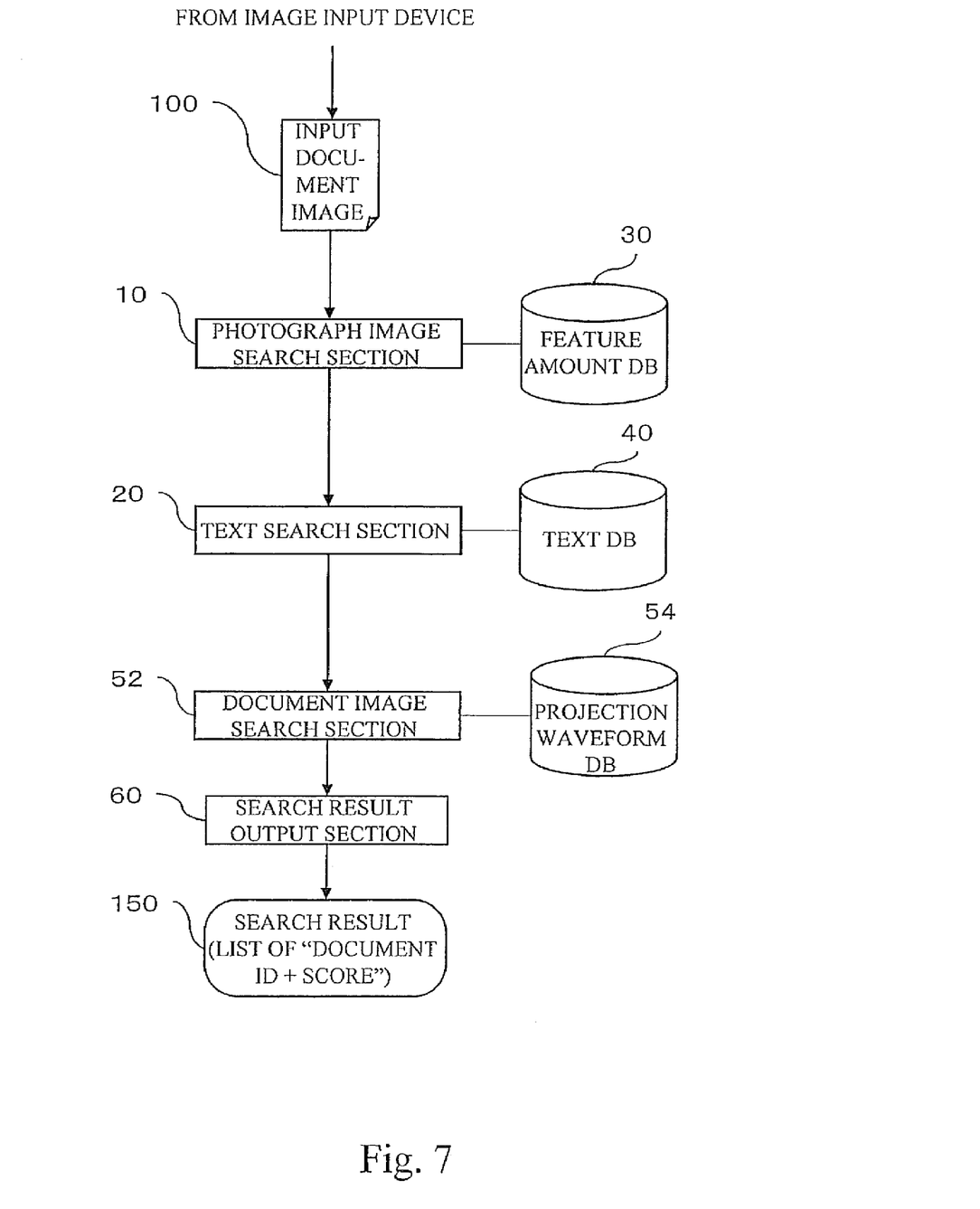
FIG. 7 is a functional block diagram showing a structure of another modified example image search apparatus.

Referring to FIG. 7, a further example of the image search apparatus will be described. In FIG. 7, elements which are identical with or similar to those shown in FIG. 1 are denoted by the same reference numerals, and their descriptions will not be repeated.

The apparatus of this modified example adopts a structure in which the photograph image search section 10 provided at the first stage, the text search section 20 provided at the second stage, and the document image search section 52 provided at the third stage are arranged in series. With this structure, the photograph image search section 10 first performs search to extract first candidates which are similar to the input document image 100 from among all the registered images, and then the text search section 20 checks each of the first candidate registered images against the input document image 100 using text search and extracts second candidates having high scores from among the first candidates.

Here, with regard to the search performed by the text search section 20, it is also advantageous to combine the similarity scores obtained by the text search with the similarity scores based on the images features which are received from the previous stage and narrow the search for obtaining the second candidate registered images on the basis of the resulting combined scores, rather than narrowing the search on the sole basis of the similarity scores obtained by the text search. With this structure, when the input document image 100 contains a large amount of text, registered images which are more similar to the input document image can be preferentially extracted due to the search performed by the text search section, and even when the input document image 100 contains a smaller amount of text, a reduction in the search precision can be suppressed by adding the similarity scores obtained by the search based on the image features. Then, the document image search section 52 finally performs matching based on a projection waveform between each of the second candidate registered images and the input document image 100, thereby providing the final search result.

With this structure, high-speed search processing can be performed with generally high search precision. Further, by disposing the photograph image search section 10 which achieves a low level of identification with regard to only a few types of documents at the first stage, the candidates can be narrowed down at high speed and with high precision. Then, with the text search section 20, which is capable of high-speed processing, disposed at the second stage, the candidates can be further narrowed down to obtain the second candidate registered images with high-speed processing. Moreover, by allowing the text search section 20 to combine the similarity scores obtained from the first stage with the similarity scores obtained by the text search and narrow the candidates on the basis of the combined scores, a decrease in the search precision can be suppressed even with regard to an input document image 100 containing a small amount of text. Then, at the third stage, the final narrowing can be performed by the document image search section 52, which is capable of achieving a high level of identification with regard to superposed items, such as notes and stamps, on images, so that a registered image having a high degree of similarity can be obtained in consideration of these notes or the like. In this case, even if the processing performed by the document image search section 52 is rather slow, the time required for the processing is only a minor matter, because the processing by the document image search section 52 is performed only with respect to the second candidate registered images which are sufficiently small in number, due to the narrowing processing at the preceding two stages.

In this example, similar to the above-described example, it is possible to skip the search processing performed at the second and the subsequent stages and obtain the final search result, if a registered image having a similarity score which is equal to or greater than a predetermined threshold value can be obtained in the photograph image search section 10 provided at the first stage. Similarly, if a registered image having a similarity score which is equal to or greater than a predetermined threshold value (which is obtained independently of the threshold value of the first stage) can be obtained in the text search section 20 provided at the second stage, the search result may be obtained by skipping the search processing performed at the third and the subsequent stage.

Figure 8:
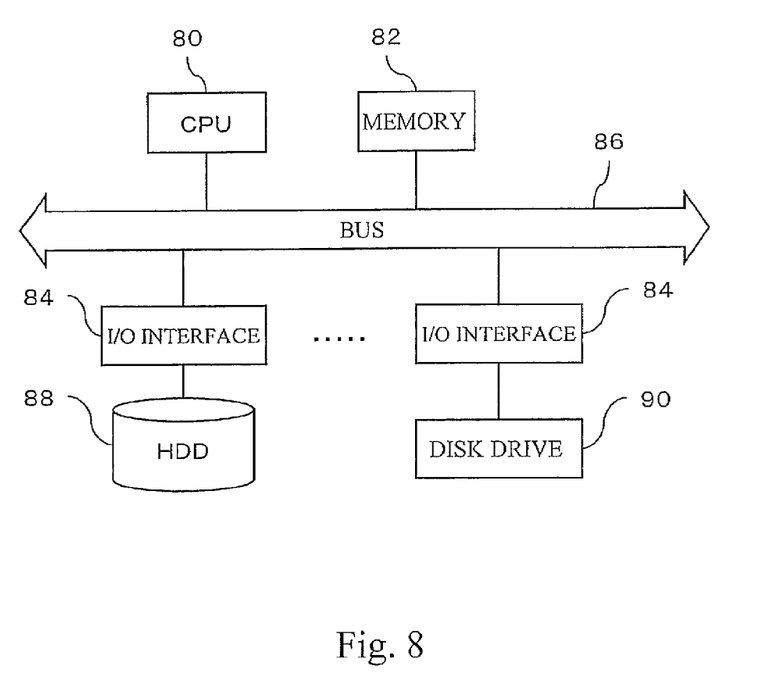
FIG. 8 is a view showing an example hardware structure of a computer system on which an image search system is implemented.

The embodiment and the examples of the present invention have been described. The image search apparatuses described above are typically implemented by executing, in a general-purpose computer, a program in which the function or the processing content (which will be described in detail below) of each section of the computer system is described. Such a computer has a circuit structure in which a CPU (central processing unit) 80, a memory (primary storage) 82, various I/O (input/output) interfaces 84, or the like are connected via a bus 86. Further, a hard disk drive 88 and a disk drive 90 for reading portable, non-volatile storage media of various standards such as CDs, DVDs, or flash memories, are connected, via the I/O interface 84, for example, to the bus 86. Such a drive 88 or 90 functions as an external storage device with respect to the memory. Specifically, a program in which the processing content of the embodiment is described is stored, via a storage medium such as a CD, a DVD, or the like, or via the network, in a fixed storage device such as the hard disk drive 88, and then installed in the computer system. The program stored in the fixed storage device is then read out and stored in the memory and is further executed by the CPU, thereby achieving the processing of the embodiment.

Because existing search applications can be directly adopted as the photograph image search section 10 and the text search section 20, it is only necessary to provide, as a program specific to the present embodiment, a program in which are described a function of supplying the input document image 100 to a plurality of search sections 10, 20 and 52 to cause these search sections to calculate the scores, and a function to be performed by the candidate extraction section 50. The individual search sections including the photograph image search section 10, the text search section 20, or the like may be configured such that they can be added to the program in a plug-in form, for example.

Although in the above examples an image search apparatus is constructed on a single computer, such a structure is merely one example, and a system structure in which each of the above-described elements constituting the image search apparatus are distributed on a network such as the Internet or a LAN also falls within the scope of the present invention. One possible example system structure is such that one or both of the feature amount DB 30 and the text DB 40 are provided on the network as separate database devices, independently of a computer in which a group of other elements is installed and are utilized by the photograph image search section 10 and the text search section 20 via the network. Further, the feature amount DB 30 and the text DB 40 may each be provided on the network singly or in a number of two or more.

Although the exemplary embodiments of the present invention have been described using specific terms, such description is for illustrative purposes only, and it is to be understood that changes and variations may be made without departing from the spirit or scope of the appended claims.

What is claimed is:

1. An image search system, comprising:
a first calculation section that calculates a first similarity score of each registered image with respect to an input image on the basis of image features of the registered image and the input image;
a second calculation section that calculates a second similarity score of each registered image with respect to the input image on the basis of text features of the registered image and the input image;
a candidate extraction section that extracts one or more candidate registered images on the basis of the first and the second similarity scores of each registered image;
a third calculation section that calculates a third similarity score of each candidate registered image on the basis of a comparison of projection waveforms of the input image and the candidate registered image; and
a search section that determines one or more registered images similar to the input image on the basis of the third similarity score of each of registered image.

2. The image search system according to claim 1, wherein the first calculation section divides the input image into a plurality of regions and obtains an image feature amount for each region, and calculates a first similarity score of each registered image with respect to the input image on the basis of a distribution of the image feature amount for each region of the input image which is obtained and a distribution of an image feature amount for each region of each registered image.

3. The image search system according to claim 1, wherein the second calculation section obtains a text feature amount concerning a text character string obtained by character recognition processing applied to the input image, and calculates a second similarity score of each registered image with respect to the input image on the basis of the text feature amount which is obtained and a text feature amount of each registered image.

4. The image search system according to claim 1, wherein the third calculation section obtains a projection waveform of the input image, and calculates a third similarity score of each candidate registered image with respect to the input image, on the basis of the comparison of the projection waveforms of the input image and a projection waveform of each candidate registered image.

5. The image search system according to claim 1, wherein the candidate extraction section applies statistical normalization processing to the first similarity score of each registered image to obtain a first normalized score of each registered image, applies statistical normalization processing to the second similarity score of each registered image to obtain a second normalized score of each registered image, and extracts a candidate registered image on the basis of the first normalized score and the second normalized score.

6. The image search system according to claim 5, wherein the candidate extraction section calculates, as the first normalized score of a registered image, a deviation value of the first similarity score of the registered image with respect to first similarity scores of all the registered images and calculates, as the second normalized score of a registered image, a deviation value of the second similarity score of the registered image with respect to second similarity scores of all the registered images.

7. An image search system, comprising:
a first candidate extraction section that calculates a first similarity score of each registered image with respect to the input image on the basis of image features of the registered image and the input image, and extracts a first candidate registered image on the basis of the first similarity score;
a second candidate extraction section that calculates a second similarity score of each first candidate registered image with respect to the input image on the basis of text features of the first candidate registered image and the input image, and extracts a second candidate registered image on the basis of the second similarity score; and
a search section that calculates a third similarity score of each second candidate registered image with respect to the input image on the basis of a comparison of projection waveforms of the input image and the candidate registered image, and determines one or more registered images similar to the input document on the basis of the third similarity score of each of registered image.

8. An image search method, comprising:
calculating a first similarity score of each registered image with respect to an input image on the basis of image features of the registered image and the input image;
calculating a second similarity score of each registered image with respect to the input image on the basis of text features of the registered image and the input image;
extracting one or more candidate registered images on the basis of the first and the second similarity scores of each registered image;
calculating a third similarity score of each candidate registered image on the basis of a comparison of projection waveforms of the input image and the candidate registered image; and
determining one or more registered images similar to the input image on the basis of the third similarity score of each of registered image.

9. An image search method, comprising:
calculating a first similarity score of each registered image with respect to the input image on the basis of image features of the registered image and the input image;
extracting a first candidate registered image on the basis of the first similarity score;
calculating a second similarity score of each first candidate registered image with respect to the input image on the basis of text features of the first candidate registered image and the input image;
extracting a second candidate registered image on the basis of the second similarity score;
calculating a third similarity score of each second candidate registered image with respect to the input image on the basis of a comparison of projection waveforms of the input image and the candidate registered image; and
determining one or more registered images similar to the input document on the basis of the third similarity score of each of registered image.

10. A non-transitory computer readable storage medium, the storage medium storing a program of instructions executed by the computer to perform a function for searching one or more registered images similar to an input image, the function comprising;
calculating a first similarity score of each registered image with respect to an input image on the basis of image features of the registered image and the input image;
calculating a second similarity score of each registered image with respect to the input image on the basis of text features of the registered image and the input image;
extracting one or more candidate registered images on the basis of the first and the second similarity scores of each registered image;

calculating a third similarity score of each candidate registered image on the basis of a comparison of projection waveforms of the input image and the candidate registered image; and determining one or more registered images similar to the input image on the basis of the third similarity score of each of registered image.

11. A non-transitory computer readable storage medium, the storage medium storing a program of instructions executed by the computer to perform a function for searching one or more registered images similar to an input image, the function comprising:

calculating a first similarity score of each registered image with respect to the input image on the basis of image features of the registered image and the input image;

extracting a first candidate registered image on the basis of the first similarity score;

calculating a second similarity score of each first candidate registered image with respect to the input image on the basis of text features of the first candidate registered image and the input image;

extracting a second candidate registered image on the basis of the second similarity score;

calculating a third similarity score of each second candidate registered image with respect to the input image on the basis of a comparison of projection waveforms of the input image and the candidate registered image; and determining one or more registered images similar to the input document on the basis of the third similarity score of each of registered image.

* * * * *